United States Patent
Kim

(10) Patent No.: US 8,228,899 B2
(45) Date of Patent: Jul. 24, 2012

(54) METHOD FOR SYNCHRONIZING SEARCHING PERIOD OF MOBILE COMMUNICATION TERMINAL AND THE MOBILE COMMUNICATION TERMINAL USING THE SAME

(75) Inventor: Min Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1157 days.

(21) Appl. No.: 11/688,201

(22) Filed: Mar. 19, 2007

(65) Prior Publication Data

US 2007/0218899 A1   Sep. 20, 2007

(30) Foreign Application Priority Data

Mar. 20, 2006   (KR) .................. 10-2006-0025406

(51) Int. Cl.
*H04L 12/66* (2006.01)

(52) U.S. Cl. .................. 370/352; 370/338; 455/41.2

(58) Field of Classification Search .............. 455/434, 455/41.2
See application file for complete search history.

(56) References Cited

U.S. PATENT DOCUMENTS

| | | | |
|---|---|---|---|
| 2002/0059434 A1* | 5/2002 | Karaoguz et al. | 709/228 |
| 2002/0080769 A1* | 6/2002 | Spencer et al. | 370/350 |
| 2004/0109441 A1* | 6/2004 | Hur et al. | 370/352 |
| 2004/0185857 A1* | 9/2004 | Lee et al. | 455/445 |
| 2005/0117547 A1* | 6/2005 | Lu | 370/335 |
| 2005/0249156 A1* | 11/2005 | Jelavic et al. | 370/329 |

FOREIGN PATENT DOCUMENTS

KR    10-2004-0030997    4/2004

* cited by examiner

*Primary Examiner* — Dwayne Bost
*Assistant Examiner* — Joseph Dean, Jr.
(74) *Attorney, Agent, or Firm* — Lee, Hong, Degerman, Kang & Waimey

(57) ABSTRACT

A method for synchronizing a searching period for a mobile communication terminal with a wireless communication module includes: determining a common searching period of the mobile communication terminal and the wireless communication module using searching periods of the mobile communication terminal and the wireless communication module; determining an offset value of the mobile communication terminal and the wireless communication module using searching points of the mobile communication terminal and the wireless communication module; and synchronizing the searching period of the mobile communication terminal with the searching period of the wireless communication module using the common searching period and the offset value, resulting in reduction of the amount of current consumption for the searching operations.

16 Claims, 6 Drawing Sheets

(a)　　　(b)　　　(c)

METHOD FOR SYNCHRONIZING SEARCHING PERIOD OF MOBILE COMMUNICATION TERMINAL AND THE MOBILE COMMUNICATION TERMINAL USING THE SAME

This application claims the priority benefit of Korean Patent Application No. 10-2006-025406, filed on Mar. 20, 2006, which is hereby incorporated by reference as if fully set forth herein.

BACKGROUND OF THE INVENTION

1. Field of the Invention

The present invention relates to a mobile communication terminal, and more particularly, to a method for synchronizing a searching period of a mobile communication terminal and the mobile communication terminal using the same.

2. Discussion of the Related Art

A conventional method for searching for a Radio Frequency (RF) signal using a mobile communication terminal equipped with a wireless communication module will hereinafter be described.

FIG. 1 is a diagram illustrating searching periods of a mobile communication terminal 10 and a short-distance wireless communication module 20.

Referring to FIG. 1, the mobile communication terminal 10 and the short-distance wireless communication module 20 searches for an RF signal according to an independent searching period. The mobile communication terminal 10 searches for the RF signal at intervals of a predetermined searching period (1), separately from the searching operation of the short-distance wireless communication module 20.

The mobile communication terminal 10 searches for a RF signal at intervals of a searching period determined by a slot-cycle index in a CDMA (Code Division Multiple Access) system, or searches for the RF signal at intervals of a searching period determined by a paging period index in a GSM (Global System for Mobile communication) system.

The short-distance wireless communication module 20 searches for the RF signal at intervals of a predetermined searching period (2), independent of the searching operation of the mobile communication terminal 10. For example, if the short-distance wireless communication module 20 is a Bluetooth system, the Bluetooth system searches for the RF signal at intervals of a searching period of 1.28 second (S). In this case, the Bluetooth system continuously maintains the searching period of 1.28 S regardless of the searching period of the mobile communication terminal 10.

However, the mobile communication terminal 10 and the short-distance wireless communication module 20 search for the RF signal, independent of each other, such that the searching period of the mobile communication terminal 10 is different from that of the short-distance wireless communication module 20.

The mobile communication terminal 10 and the short-distance wireless communication module 20 search for the RF signal independently at different searching periods, resulting in an increased amount of current consumption for the independent searching operation.

In this way, the mobile communication terminal 10 and the short-distance wireless communication module 20 search for the RF signal independently at different searching periods, such that a standby or waiting time of the mobile communication terminal 10 is decreased.

SUMMARY OF THE INVENTION

An object of the present invention is to provide a mobile communication terminal equipped with a wireless communication module, and a method for synchronizing the searching period of the mobile communication terminal with that of the wireless communication module by adjusting searching periods of the mobile communication terminal and the wireless communication module.

Another object of the present invention is to provide a method for synchronizing searching periods of a mobile communication terminal and a wireless communication module with each other, thereby reducing an amount of current consumption for independent searching operations.

Yet another object of the present invention is to provide a method for synchronizing searching periods of a mobile communication terminal and a wireless communication module with each other, thereby increasing a standby or waiting time of the mobile communication terminal.

In one aspect of the invention there is provided to achieve these objects and other advantages and in accordance with the purpose of the invention, as embodied and broadly described herein, a method for synchronizing a searching period of a mobile communication terminal with a wireless communication module comprising: determining a common searching period of the mobile communication terminal and the wireless communication module; determining an offset value of the mobile communication terminal and the wireless communication module; and synchronizing the searching period of the mobile communication terminal with the searching period of the wireless communication module using the common searching period and the offset value.

In another aspect of the present invention, there is provided a mobile communication terminal for synchronizing a searching period where the mobile communication terminal is equipped with a wireless communication module comprising: a timing processor configured to measure a searching period and searching point of the mobile communication terminal, and a searching period and a searching point of the wireless communication module; an arithmetic processing unit configured to determine a common searching period and an offset value of the mobile communication terminal and the wireless communication module using the measured searching periods and the measured searching points; and a controller configured to synchronize the searching period of the mobile communication terminal with the searching period of the wireless communication module using the common searching period and the offset value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
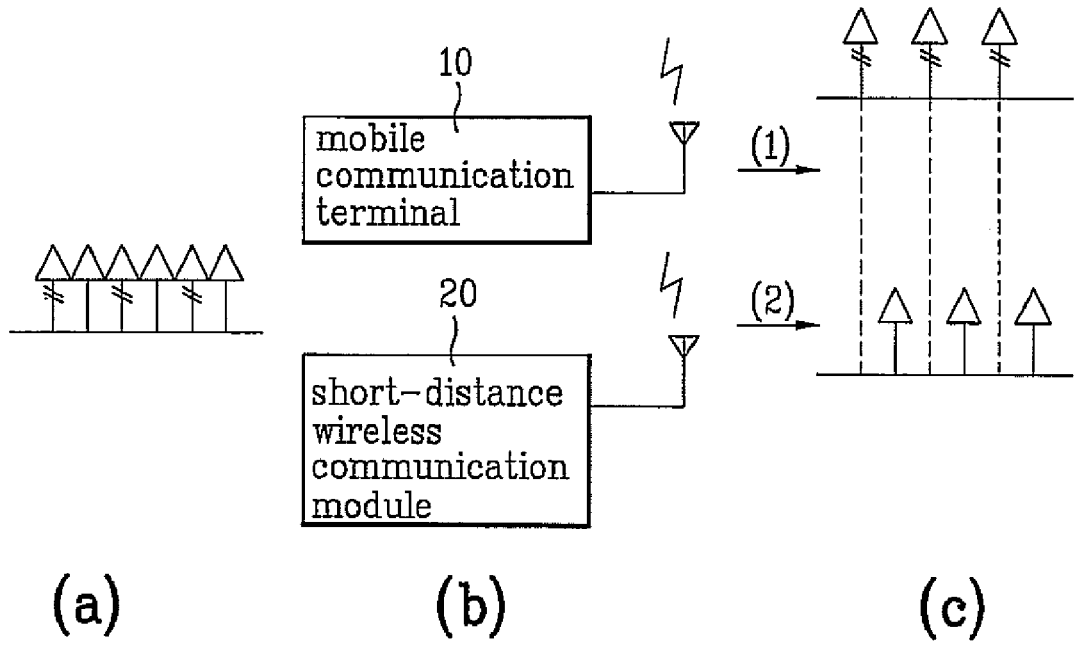
FIG. 1 illustrates searching periods of a mobile communication terminal and a short-distance wireless communication module according to the conventional art.
Figure 2:
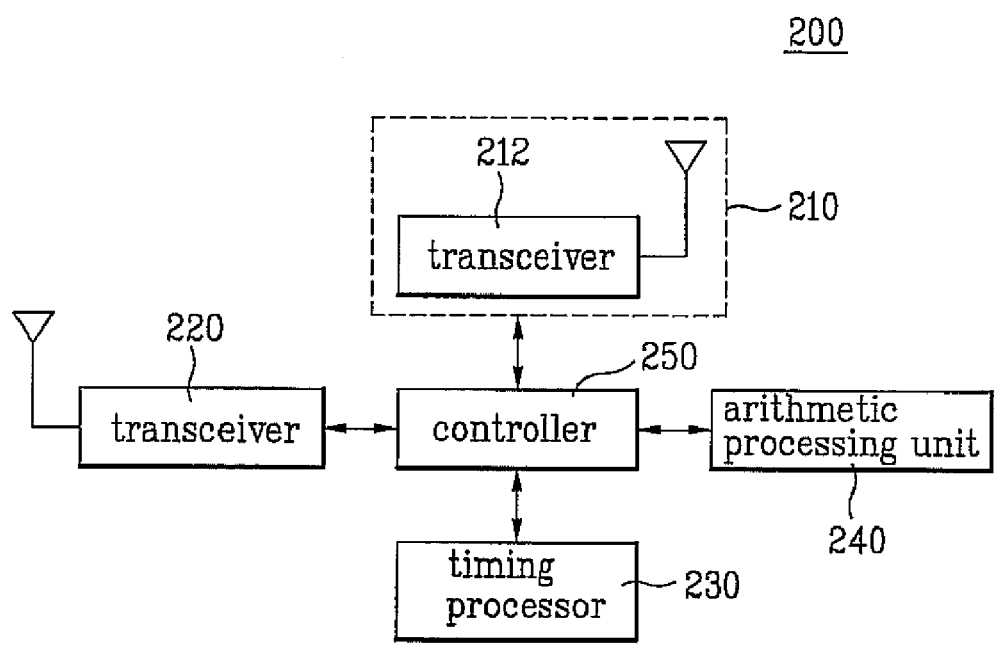
FIG. 2 is a block diagram of a mobile communication terminal configured to synchronize a searching period according to the present invention.

A mobile communication terminal capable of synchronizing a searching period according to the present invention will hereinafter be described with reference to FIG. 2. FIG. 2 is a block diagram of a mobile communication terminal configured to synchronize a searching period according to the present invention.

Referring to FIG. 2, the mobile communication terminal 200 includes a wireless communication module 210, a transceiver 220, a timing processor 230, an arithmetic processing unit 240 and a controller 250.

The transceiver 220 transmits or receives RF signals to/from a base station. The timing processor 230 checks a variety of items associated with searching operations of the mobile communication terminal 200 and the wireless communication module 210. The arithmetic processing unit 240 determines a common searching period and an offset value of the mobile communication terminal 200 and the wireless communication module 210 on the basis of the checked items. The controller 250 synchronizes a searching period of the mobile communication terminal 200 with that of the wireless communication module 210 using the calculated values.

The wireless communication module 210 is a device capable of performing transmission/reception of an RF signal using a wireless communication system, and processing the RF signal. The wireless communication module 210 includes a transceiver 212 transmitting or receiving an RF signal based on wireless communication.

In a preferred embodiment of the present invention, the wireless communication module 210 is a short-distance wireless communication module. For example, the short-distance wireless communication module may be at least one of a Bluetooth system, a zigbee system, an ultra wide band (UWB) and a wireless local area network (W-LAN). For the convenience of description and better understanding of the present invention, it is assumed that the wireless communication module 210 is the Bluetooth system.

Specifically, the wireless communication module 210 searches for an RF signal paged to the transceiver 212 at intervals of the searching period synchronized by the controller 250. The transceiver 220 receives an RF signal from an external base station, or transmits an RF signal to the external base station.

The timing processor 230 measures a searching period and a searching point of the mobile communication terminal 200, and a searching period and a searching point of the wireless communication module 210. The timing processor 230 measures a searching period and a searching point of the RF signal paged to the transceiver 220. The timing processor 230 measures a searching period and a searching point of the RF signal paged to the transceiver 212 contained in the wireless communication module 210.

In this case, the searching period is the period of searching an RF signal paged to either the mobile communication terminal 200 or the wireless communication module 210. The searching point is a specific point at which the RF-signal searching operation is performed by the mobile communication terminal 200 or the wireless communication module 210.

The arithmetic processing unit 240 determines a common searching period and an offset value of the mobile communication terminal 200 and the wireless communication module 210 using the searching periods and the searching points measured by the timing processor 230. Specifically, the arithmetic processing unit 240 determines the least common multiple period of the searching period of the mobile communication terminal 200 and the searching period of the wireless communication module 210, as the common searching period. For example, provided that the searching period of the mobile communication terminal 200 is equal to "4 S" and the searching period of the wireless communication module 210 is equal to "3 S", the arithmetic processing unit 240 may determine "12 S" as the common searching period.

The arithmetic processing unit 240 determines one of the measured searching periods as the common searching period using a modulo (MOD) function. A detailed description thereof will be described below with reference to FIG. 4

The arithmetic processing unit 240 subtracts the searching point of the wireless communication module 210 from the searching point of the mobile communication terminal 200, thereby calculating the offset value. For example, the arithmetic processing unit 240 determines the searching point of the mobile communication terminal 200 as a reference point, and uses a first searching point, i.e., an initial searching point of the wireless communication module 210 on the basis of the reference point. A detailed description thereof will be described below with reference to FIG. 5.

The controller 250 synchronizes the searching period of the mobile communication terminal 200 with the searching period of the wireless communication module 210 using the common searching period and the offset value calculated by the arithmetic processing unit 240. A detailed description thereof will be described below with reference to FIG. 5.

Figure 3:
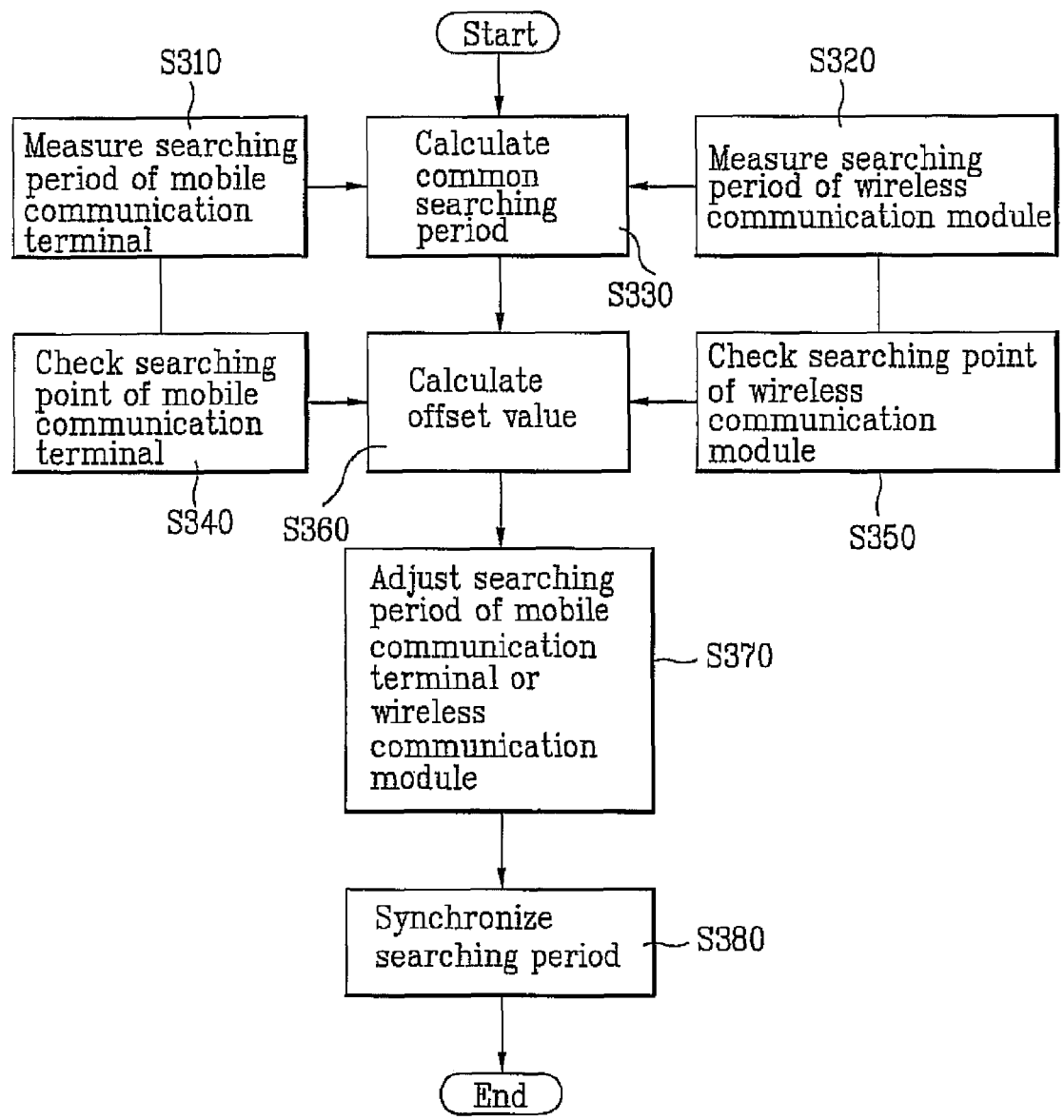
FIG. 3 is a flow chart of a method for synchronizing a searching period of a mobile communication terminal according to the present invention.

FIG. 3 is a flow chart illustrating a method for synchronizing a searching period of a mobile communication terminal according to the present invention.

The method for synchronizing the searching period of the mobile communication terminal 200 according to the present invention will hereinafter be described with reference to FIG. 3. Referring to FIG. 3, the timing processor 230 measures a searching period ('Tp') of the mobile communication terminal 200 (S310).

For example, a method for establishing a paging period by a slot-cycle index of a CDMA system will hereinafter be described in detail.

A slot of a paging channel is numbered from 0 to 2047. Each paging slot has a period of 80 ms. The mobile communication terminal 200 has an allocated slot number and a slot-cycle index. In this case, the number "n" of slots assigned to a specific point between start points adjacent to each other is a function of an index "i", and is denoted by $n=16\times2^i$ (where i=0 or positive integer).

For example, provided that the mobile communication terminal 200 has a slot-cycle index "0", each of the allocated slots adjacent to each other begins at a period of 16 slots (i.e., 1.28 S). Therefore, provided that the mobile communication terminal 200 has the slot-cycle index "0" and the slot number "3", slot allocation is continuously performed in the order of third slot (Slot No. 3)→19-th slot (Slot No. 19)→35-th slot (Slot No. 35), . . . , →2019-th slot (Slot No. 2019)→2035-th slot (Slot No. 2035) at intervals of 16 slots. Therefore, the mobile communication terminal 200 establishes the searching period according to the paging period determined by the slot-cycle index.

The GSM (Global System for Mobile communications) system establishes the searching period at intervals of a paging period determined by a paging period index. A detailed description thereof will be described later with reference to FIG. 7.

The timing processor 230 measures a searching period ('Tb') of the wireless communication module 210 (S320). For example, the timing processor 230 determines a start point of the searching period of the mobile communication terminal 200 as a reference point, and may measure the searching period of the wireless communication module 210 while measuring the searching period of the mobile communication terminal 200.

For the convenience of description and better understanding of the present invention, it is assumed that the wireless communication module 210 is the Bluetooth system.

The Bluetooth system searches a RF signal paged to the Bluetooth system at intervals of 1.28 S. The Bluetooth system performs the searching operation according to at least one of a sniff mode, a hold mode, and a park mode. For example, the sniff mode is adjusted by a fixed period "Tsniff" and an offset slot "Dsniff", such that the Bluetooth system can perform "Nsniff" searching operations (i.e., "Nsniff" means number of searching operations) during the sniff mode.

During the hold mode, the Bluetooth system is unable to receive data, and is able to receive only audio data or audio information. The hold mode performs the searching operation at intervals of a searching period "Thold". The park mode allows a master to communicate with a slave over a broadcast channel. Specifically, the present invention employs the sniff mode.

The arithmetic processing unit 240 calculates a common searching period ('Tcom') using the searching periods of the mobile communication terminal 200 and the wireless communication module 210 (S330).

For example, the arithmetic processing unit 240 may determine the least common multiple period of searching periods of the mobile communication terminal 200 and the wireless communication module 210 as the common searching period.

The arithmetic processing unit 240 may calculate the common searching period using the modulo (MOD) function. A detailed description thereof will be described below with reference to FIG. 4.

The timing processor 230 checks a searching point ('Sp') of the mobile communication terminal 200 (S340).

As previously stated above, the timing processor 230 checks a start point of the searching period of the mobile communication terminal 200, and determines the start point of the searching period as the searching point.

The timing processor 230 checks a searching point ('Sb') of the wireless communication module 210 (S350). For example, the timing processor 230 checks the searching point of the wireless communication module 210 on the basis of the searching point of the mobile communication terminal 200.

The arithmetic processing unit 240 calculates the offset value ('Soff') of the mobile communication terminal 200 and the wireless communication module 210 using the checked searching points (S360). The offset value is calculated by subtracting the searching point of the wireless communication module 210 from the searching point of the mobile communication terminal 200 using the following Equation 1.

$$Soff = Sp - Sb$$ [Equation 1]

The arithmetic processing unit 240 determines the searching point of the mobile communication terminal 200 as a reference point, detects a first (or initial) searching point of the wireless communication module 210 on the basis of the reference point, and uses the detected first (or initial) searching point of the wireless communication module 210. For example, if the value of Sp is zero (i.e., Sp=0) and the value of Sb is 3 (Sb=3), the value of Soff is equal to "−3".

The controller 250 adjusts the searching periods of the mobile communication terminal 200 or the wireless communication module 210 according to the calculated common searching period and the offset value (S370).

For example, provided that the calculated common searching period is "4 S", i.e., Tcom=4 S, and the offset value is "−2 S", i.e., Tb=2 S, the controller 250 adjusts the searching period of the wireless communication module 210, such that the searching period of the wireless communication module 210 reaches the time of 4 S. In order to perform the searching operations at the same start point, the controller 240 adjusts the searching point of the wireless communication module 210 to be preceded by a predetermined time of 2 S.

The controller 250 synchronizes the searching period of the mobile communication terminal 200 with the searching period of the wireless communication module 210 at intervals of the adjusted searching period (S380).

Figure 4:
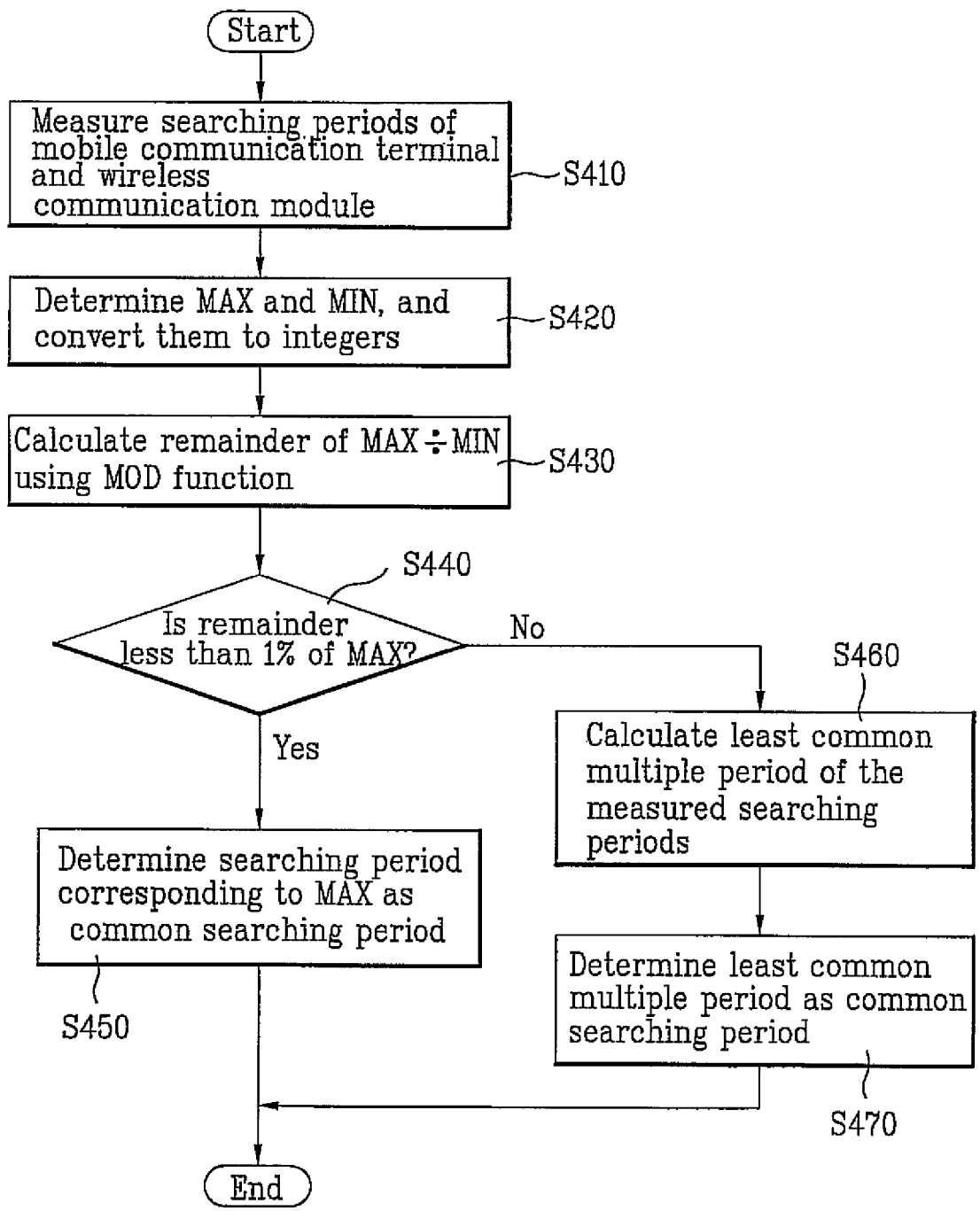
FIG. 4 is a flow chart of a method for determining a common searching period of a mobile communication terminal according to the present invention.

FIG. 4 is a flow chart illustrating a method for determining a common searching period of a mobile communication terminal 200 according to the present invention.

Referring to FIG. 4, the timing processor 230 measures the searching period ('Tp') of the mobile communication terminal 200 and the searching period ('Tb') of the wireless communication module 210 (S410).

A method for measuring the searching period using the timing processor 230 has been disclosed above, such that a detailed description thereof will herein be omitted for the convenience of description.

The arithmetic processing unit 240 determines a maximum value ('MAX') and a minimum value ('MIN') from among the measured searching periods 'Tp' and 'Tb', and converts the MAX and MIN values to integers, respectively (S420).

The arithmetic processing unit 240 divides the searching period corresponding to the MAX value by the searching period corresponding to the MIN value using the modulo (MOD) function, and calculates a remainder of the division (S430). For example, if the 'Tp' value converted to the form of an integer is "4 S" and the 'Tb' value converted to the form of an integer is "2 S", the remainder becomes zero.

The controller 250 determines whether the remainder is less than 1% of the searching period corresponding to the MAX value (S440).

It should be noted that the operation of the controller 250 for determining whether the remainder is less than 1% of the searching period corresponding to the MAX value has been disclosed as an example. Preferably, the controller 250 determines whether the remainder is less than a specific percentage of the searching period corresponding to the MAX value as necessary.

If the remainder is less than 1% of the searching period corresponding to the MAX value, the controller 250 determines the searching period corresponding to the MAX value as the common searching period (S450).

Otherwise, if the remainder is equal to or greater than 1% of the searching period corresponding to the MAX value, the controller 250 calculates the least common multiple period of the measured searching periods (S460), For example, if the 'Tp' value corresponding to the MAX value is "5 S" and the 'Tb' value corresponding to the MIN value is "2 S", the remainder "1" is greater than 1% of the 'Tp' value, such that the controller 250 calculates the least common multiple "10" of two numbers 5 and 2. Therefore, the least common multiple period becomes the time of "10 S".

The controller 250 determines the calculated least common multiple period as the common searching period (S470).

Figure 5:
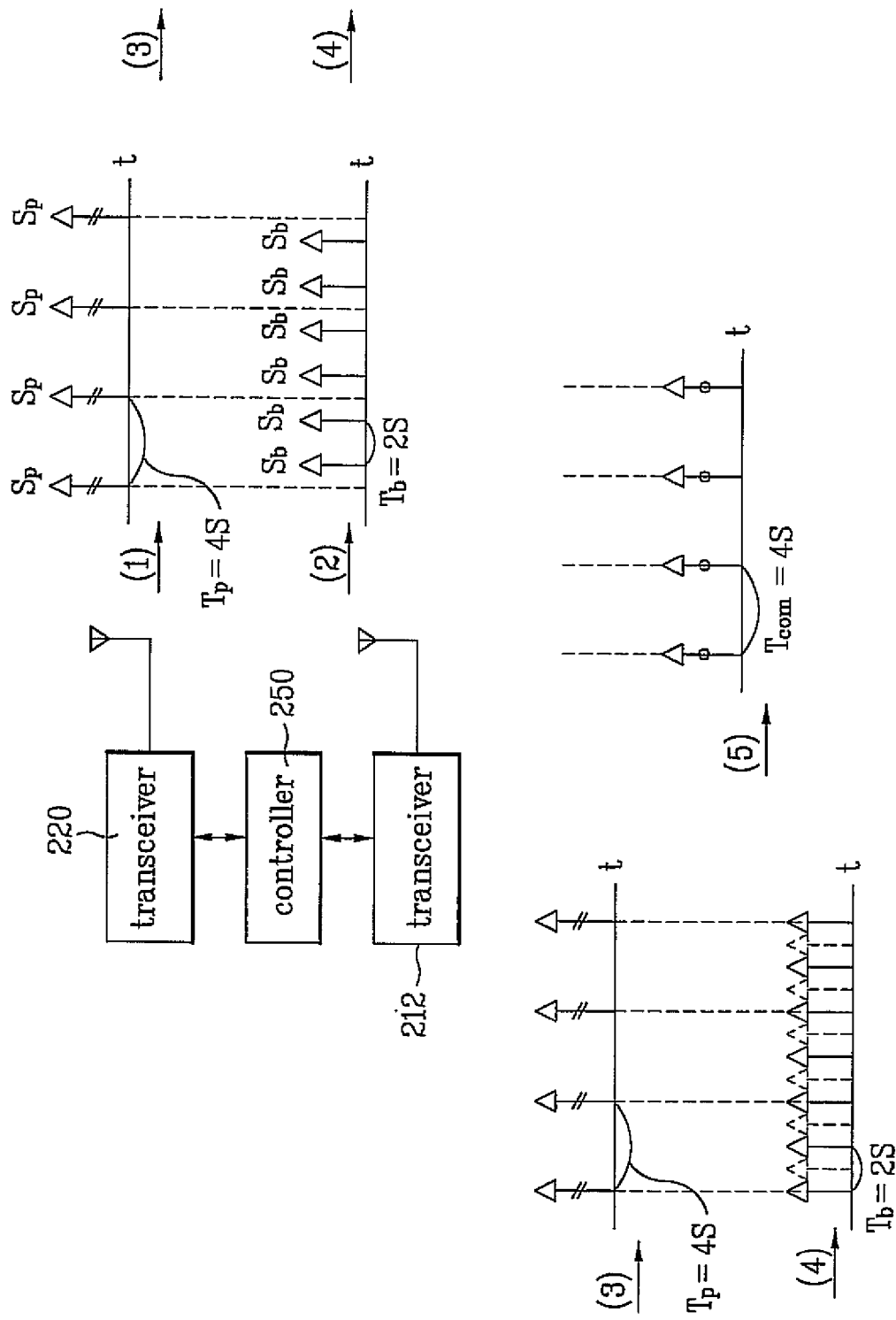
FIG. 5 illustrates a graph of a method for synchronizing searching periods of a mobile communication terminal and a wireless communication module in accordance with an embodiment of the present invention.

FIG. 5 is a graph illustrating a method for synchronizing searching periods of a mobile communication terminal 200 and a wireless communication module 210 with each other in accordance with a preferred embodiment of the present invention.

Referring to FIG. 5, the mobile communication terminal 200 searches for the RF signal paged to the transceiver 220 at intervals of a searching period ('Tp') (1). In this case, the 'Tp' value is "4 S", such that the mobile communication terminal 200 searches for the RF signal at intervals of the time of "4 S".

The wireless communication module 210 searches for the RF signal paged to the transceiver 212 contained in the wireless communication module 210 at intervals of a searching period ('Tb') (2). In this case, the 'Tb' value is "2 S", such that the wireless communication module 210 searches for the RF signal at intervals of the time of "2 S".

The mobile communication terminal 200 performs the searching operation (1), and the wireless communication module 210 performs the searching operation (2), such that the searching operations (1) and (2) are executed separately from each other, The timing processor 230 checks the searching point ('Sp') of the mobile communication terminal 200 and the searching point ('Sb') of the wireless communication module 210, calculates an offset value using the checked searching points 'Sp' and 'Sb', and compensates for the 'Sb' using the offset value (3, 4).

One of several searching points ('Sp') of the mobile communication terminal 200 is determined as a reference point, and it is determined which searching point ('Sb') of the wireless communication module 210 is first checked on the basis of the reference point, such that the first (or initial) searching point of several searching points ('Sb') of the wireless communication module 210 is used to calculate the offset.

If the 'Sb' is subtracted from the 'Sp' (i.e. 'reference point'), the offset value is calculated, such that the 'Sb' is compensated for by the offset value, as shown in (3) and (4). For example, if the reference point is "0" and the first or initial searching point is "1", the offset value becomes "−1". The 'Sb' moves forward by time of "1 S" according to the offset value, such that the 'Sb' is compensated for. As a result, the start point of the 'Sp' value is equal to the start point of the 'Sb' value.

The arithmetic processing unit 240 calculates the common searching period ('Tcom') using the Tp and Tb values, as shown in the reference number (5). For example, the common searching period is the least common multiple of the Tp and Tb values. Therefore, the 'Tp' value is "4 S" and the 'Tb' value is "2 S", such that the common searching period becomes "4 S". Therefore, the mobile communication terminal 200 and the wireless communication module 210 perform the searching operation at intervals of the time of "4 S", such that the searching operations of the mobile communication terminal 200 and the wireless communication module 210 are performed at the same time.

Figure 6:
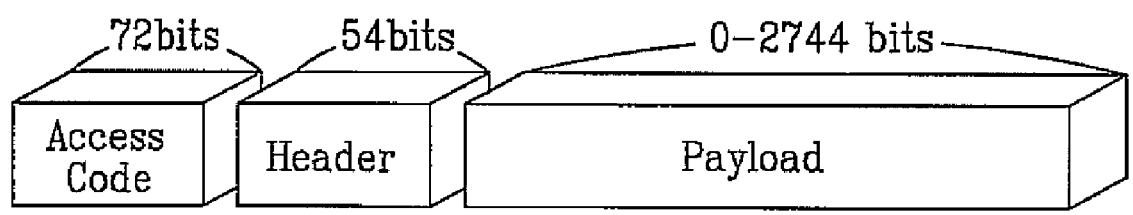
FIG. 6 illustrates a wireless packet received by a wireless communication module according to the present invention.

FIG. 6 is a structural diagram illustrating a wireless packet received by wireless communication module 210 according to the present invention.

Referring to FIG. 6, the wireless packet includes an access code of 72 bits, a header of 54 bits, and a payload from 0 to 2744 bits. The access code is indicative of a series of symbols used in a network to identify the beginning of the wireless packet. The access code has a fixed length, and may include a master ID, a slave ID, or an inquiry access code.

In a normal communication mode, a master unit or a slave unit employs the master ID as the access code. Since a network includes only one master unit, the master ID is adapted to identify the network. The slave ID is used when a master addresses a slave or the slave answers the master, such that a communication link between the master unit and the slave unit can be established.

The header may or may not be contained in the wireless packet of FIG. 6. If the header is contained in the wireless packet of FIG. 6, the header has a fixed length and includes a control word.

The payload transmits control information, audio information, or data information for network connection. The length of the payload varies from 0 to 2744 bits. A control wireless packet, received when measuring the searching period, includes a payload equipped with at least two control words. In this case, the control wireless packet is indicative of a Frequency Hopping Synchronization (FHS) packet for transmitting master information, clock information or BD_ADDR (Bluetooth Device Address) information.

The master unit acts as a start device for communication, and the slave acts as a response device for answering the communication start device. The ID packet is a 68-bit packet composed of a DAC (Device Access Code) and an IAC (Inquiry Access Code). Therefore, a reception end receives the ID packet, and performs bit correlation, resulting in the implementation of synchronization. The DAC is used for paging and a paging response, etc. The IAC is used for an inquiry procedure. The inquiry procedure is indicative of a predetermined procedure in which a variety of setup values for wireless connection functions (e.g., clock offset or scan-setting function) of peripheral communication devices are acquired.

In other words, the master transmits its own ID packet to the slave to execute the inquiry and command. The slave answers the ID packet of the master, and transmits the FHS packet to the master, thereby performing the inquiry and command. In this case, the paging operation is executed at a baseband. The master transmits the ID packet to the slave to perform the paging command, and receives the response ID packet from the slave. Therefore, a traffic channel between the master and the slave is established, such that the paging is executed.

Figure 7:
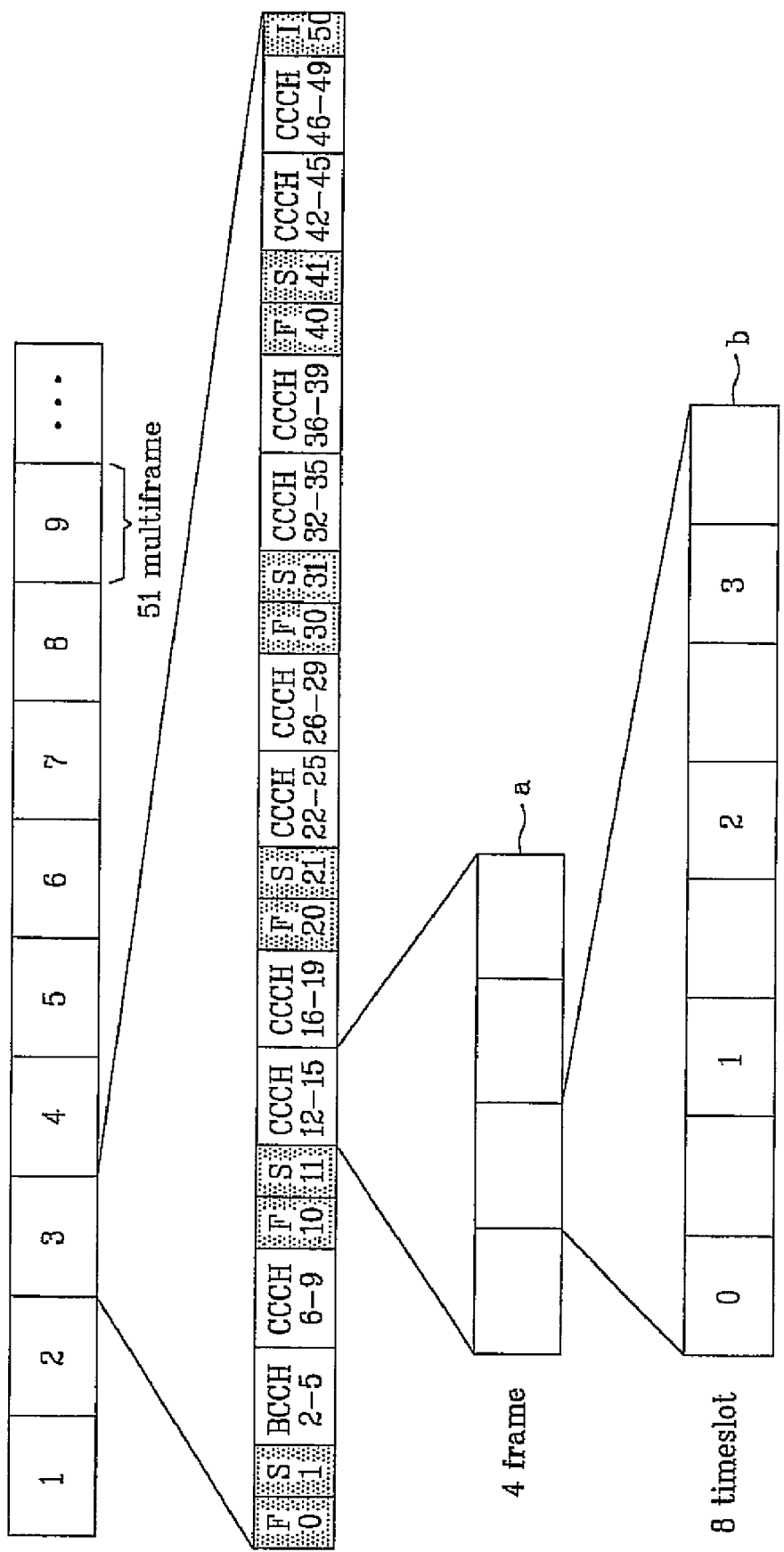
FIG. 7 illustrates a packet for controlling a searching period of a mobile communication terminal in according to the present invention.

FIG. 7 is a structural diagram illustrating a packet for controlling a searching period of a mobile communication terminal in accordance with a preferred embodiment of the present invention.

For the convenience of description and better understanding of the present invention, the GSM system will be used as an example. However, it should be noted that the scope of the present invention is not limited to the GSM system, and can also be applied to other systems (e.g., a CDMA or FDMA system).

The GSM system is based on a TDMA RAT (Time Division Multiple Access Radio Access Technology). The paging period of the GSM system controls variables of the multi-frame paging group, such that it is determined by the location of a prescribed receiving mode.

First, four frames are selected from among fifty one multi-frames. In this case, a common control channel (CCCH) composed of 4 frames is selected by the selected paging group number, as shown in the reference character (a).

The CCCH arranges a time slot of the packet channel, and defines interleaving value and offset value of the channel. Provided that the value "CCCH_group( )" is "1", the value "CCCH_group( )" begins at zero, such that a CCCH of a second group is selected.

Thereafter, it is determined which one of timeslots contained in the CCCH_group( ) will be used, as shown in the reference character (b). If the value "CCCH_group( )" is "1", a third timeslot from among several timeslots is selected.

As apparent from the above description, a mobile communication terminal 200 includes a wireless communication module 210, and a method of adjusting searching periods of the mobile communication terminal 200 and the wireless communication module 210 is provided, thereby synchronizing the searching period of the mobile communication terminal 200 with that of the wireless communication module 210.

The method of synchronizing searching periods of the mobile communication terminal 200 and the wireless communication module with each other reduces an amount of current consumption for independent searching operations.

The method of synchronizing searching periods of the mobile communication terminal 200 and the wireless communication module 210 with each other increases a standby or waiting time of the mobile communication terminal 200.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for synchronizing a measured searching period of a mobile communication terminal with a measured searching period of a wireless communication module of the mobile terminal, the method comprising:
   determining a common measured searching period using the measured searching period of the mobile communication terminal and the measured searching period of the wireless communication module, the determining a common measured searching period comprising:
   dividing a first measured searching period corresponding to a maximum value among measured searching periods by a second measured searching period corresponding to a minimum value among the measured searching periods,
   calculating a remainder from the dividing,
   determining the common measured searching period to be the first measured searching period when the remainder is less than a specific percentage of the maximum value, and
   determining the common measured searching period to be a least common multiple of the measured searching periods when the remainder is equal to or greater than the specific percentage of the maximum value;
   determining an offset value with respect to the mobile communication terminal and the wireless communication module; and
   synchronizing the measured searching period of the mobile communication terminal with the measured searching period of the wireless communication module using the common measured searching period and the offset value,
   wherein the measured searching period of the mobile communication terminal is a period for searching a first radio frequency (RF) signal that is used to page the mobile communication terminal, and
   wherein the measured searching period of the wireless communication module is a period for searching a second RF signal that is used to page the wireless communication module of the mobile communication terminal.

2. The method of claim 1, wherein determining the common measured searching period further comprises:
   measuring the searching periods of the mobile communication terminal and the searching periods of the wireless communication module.

3. The method of claim 1, wherein the offset value is determined by determining a first measured searching point of the mobile communication terminal and a second measured searching point of the wireless communication module, and calculating the offset value based on the first and second measured searching points.

4. The method of claim 1, wherein determining the common measured searching period further comprises:
   measuring the searching periods of the mobile communication terminal and the searching periods of the wireless communication module; and
   converting each of the maximum value and the minimum value to an integer.

5. The method of claim 4, wherein a Modulo (MOD) function is used for dividing the first measured searching period by the second measured searching period and calculating the remainder of the division.

6. The method of claim 1, wherein the determining the offset value comprises subtracting a measured searching point of the wireless communication module from a measured searching point of the mobile communication terminal.

7. The method of claim 6, wherein determining the offset value further comprises:
   determining the measured searching point of the mobile communication terminal as a reference point;
   detecting a first measured searching point from among several searching points of the wireless communication module according to the reference point; and
   using the detected first measured searching point to calculate the offset value.

8. The method of claim 1, further comprising:
   adjusting at least one of the measured searching period of the mobile communication terminal and the measured searching period of the wireless communication module according to the common measured searching period and the offset value.

9. A mobile communication terminal for synchronizing measured searching periods, the mobile communication terminal comprising:
   a wireless communication module;
   a timing processor configured to measure searching periods and measured searching points of the mobile communication terminal and to measure searching periods and measured searching points of the wireless communication module;
   an arithmetic processing unit configured to determine:
   a common measured searching period using the measured searching period of the mobile communication terminal and the searching period of the wireless communication module by:
   dividing a first measured searching period corresponding to a maximum value among the measured searching periods by a second measured searching period corresponding to a minimum value among the measured searching periods, calculating a remainder from the dividing, determining the common measured searching period to be the measured searching period corresponding to the first measured searching period when the remainder is less than a specific percentage of the maximum value, and determining the common searching period to be a least common multiple of the measured searching periods when the remainder is equal to or greater than the specific percentage of the maximum value;

an offset value with respect to the mobile communication terminal and the wireless communication module using the measured searching point of the mobile communication terminal and the measured searching point of the wireless communication module; and a controller configured to synchronize the measured searching period of the mobile communication terminal with the measured searching period of the wireless communication module using the common measured searching period and the offset value, wherein the measured searching period of the mobile communication terminal is a period for searching a first radio frequency (RF) signal that is used to page the mobile communication terminal, and wherein the measured searching period of the wireless communication module is a period for searching a second RF signal that is used to page the wireless communication module of the mobile communication terminal.

10. The mobile communication terminal of claim 9, further comprising:

a transceiver configured to at least transmit or receive an RF signal, wherein the timing processor is further configured to measure searching periods and searching points for paging of the RF signal.

11. The mobile communication terminal of claim 9, wherein the wireless communication module comprises a short-distance wireless communication module.

12. The mobile communication terminal of claim 11, wherein the short-distance wireless communication module comprises at least a Bluetooth™ system, a Zigbee™ system, a ultra wide band (UWB) or a wireless local area network (W-LAN).

13. The mobile communication terminal of claim 9, wherein the wireless communication module comprises a transceiver configured to at least transmit or receive an RF signal, and wherein the timing processor is further configured to measure searching periods and searching points for paging of the RF signal.

14. The mobile communication terminal of claim 9, wherein the arithmetic processing unit determines common measured searching period using a modulo(MOD) function.

15. The mobile communication terminal of claim 9, wherein the arithmetic processing unit determines the offset value by subtracting the measured searching point of the wireless communication module from the measured searching point of the mobile communication terminal.

16. The mobile communication terminal of claim 15, wherein the arithmetic processing unit determines the measured searching point of the mobile communication terminal as a reference point, and detects a first measured searching point from among several measured searching points of the wireless communication module on the basis of the reference point.

* * * * *